(12) United States Patent
Wu et al.

(10) Patent No.: US 11,233,671 B2
(45) Date of Patent: Jan. 25, 2022

(54) SMART INTERNET OF THINGS MENUS WITH CAMERAS

(71) Applicant: Motorola Mobility LLC, Chicago, IL (US)

(72) Inventors: Yi Wu, Chicago, IL (US); Zhengping Ji, Hinsdale, IL (US); Rachid Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/203,175

(22) Filed: Nov. 28, 2018

(65) Prior Publication Data
US 2020/0169427 A1   May 28, 2020

(51) Int. Cl.
*H04L 12/28*   (2006.01)
*G06K 9/00*    (2006.01)
(Continued)

(52) U.S. Cl.
CPC .......... *H04L 12/282* (2013.01); *G06F 3/0482* (2013.01); *G06F 3/04842* (2013.01); *G06K 9/00087* (2013.01); *H04L 12/2812* (2013.01); *H04L 12/2814* (2013.01); *H04L 67/125* (2013.01); *H04M 1/72409* (2021.01);
(Continued)

(58) Field of Classification Search
CPC ... H04W 4/70; H04N 21/41; H04N 21/44227; H04N 21/4131; H04N 21/43615; H04N 21/42224; H04M 1/72415; H04M 1/72409; H04M 2250/22; H04M 2250/52; H04M 1/72448; H04M 1/72457; H04M 1/72412; H04L 67/125; H04L 12/282; H04L 12/2814; H04L 12/2812; H04L 12/2827; H04L 67/12; H04L 12/2803; G06F 3/0482; G06F 3/04842; G06F 3/0488; G06F 3/04847; G06K 9/00201
See application file for complete search history.

(56) References Cited

U.S. PATENT DOCUMENTS 6,496,927 B1 * 12/2002 McGrane ........... H04N 21/4122
                                                 348/E5.108
7,917,855 B1 *  3/2011 Satish ..................... G06F 9/451
                                                    715/744
(Continued)

FOREIGN PATENT DOCUMENTS

EP          3168730          5/2017

OTHER PUBLICATIONS

Davies, Daniel, "Search and Exam Report", GB Application No. GB1917285.7; dated May 1, 2020.
(Continued)

*Primary Examiner* — Ramy M Osman

(57) ABSTRACT

Systems and methods for providing smart internet of things (IOT) menus utilize a camera of an electronic communications device and entail capturing an image of an IOT device of interest using a camera of the electronic communications device and identifying the IOT device of interest. The IOT of interest is displayed and may be selected by the device user. The user of the electronic communications device is identified and their historical behavior with respect to the selected IOT device is analyzed. A customized, rather than full, IOT device control menu is then generated and presented to the user.

19 Claims, 10 Drawing Sheets

(51) Int. Cl.
*G06F 3/0482* (2013.01)
*G06F 3/0484* (2013.01)
*H04W 4/70* (2018.01)
*H04N 21/41* (2011.01)
*H04L 29/08* (2006.01)
*H04M 1/72457* (2021.01)
*H04M 1/72448* (2021.01)
*H04M 1/72415* (2021.01)
*H04M 1/72409* (2021.01)
*H04N 21/442* (2011.01)
*H04N 21/436* (2011.01)

(52) U.S. Cl.
CPC ... *H04M 1/72415* (2021.01); *H04M 1/72448* (2021.01); *H04M 1/72457* (2021.01); *H04N 21/41* (2013.01); *H04N 21/43615* (2013.01); *H04N 21/44227* (2013.01); *H04W 4/70* (2018.02); *G06K 9/00201* (2013.01)

(56) References Cited

U.S. PATENT DOCUMENTS

| | | | | |
|---|---|---|---|---|
| 10,402,294 | B1* | 9/2019 | Czeskis | G06F 9/44505 |
| 11,153,427 | B2* | 10/2021 | Chi | H04M 1/72415 |
| 2008/0147684 | A1* | 6/2008 | Sadovsky | H04L 67/22 |
| 2011/0072370 | A1* | 3/2011 | Mitchell | G06F 9/451 |
| | | | | 715/762 |
| 2013/0278709 | A1* | 10/2013 | Mock | H04N 21/4788 |
| | | | | 348/14.03 |
| 2014/0181934 | A1* | 6/2014 | Mayblum | H04L 51/32 |
| | | | | 726/7 |
| 2014/0207282 | A1* | 7/2014 | Angle | H04L 67/125 |
| | | | | 700/257 |
| 2014/0274380 | A1* | 9/2014 | Kazama | A63F 13/355 |
| | | | | 463/31 |
| 2015/0033143 | A1* | 1/2015 | Lee | H04L 51/16 |
| | | | | 715/752 |
| 2015/0084857 | A1* | 3/2015 | Kimura | G06F 3/03 |
| | | | | 345/156 |
| 2015/0271432 | A1* | 9/2015 | Muth | H04W 12/50 |
| | | | | 348/552 |
| 2016/0062579 | A1* | 3/2016 | Lee | G06F 9/453 |
| | | | | 715/708 |
| 2016/0381201 | A1* | 12/2016 | Park | H04W 4/70 |
| | | | | 455/557 |
| 2017/0048648 | A1* | 2/2017 | Lee | H04L 67/16 |
| 2017/0134553 | A1* | 5/2017 | Jeon | G06F 3/0482 |
| 2018/0176009 | A1* | 6/2018 | Agerstam | H04L 67/16 |
| 2018/0184298 | A1* | 6/2018 | Chen | H04W 4/70 |
| 2018/0199001 | A1* | 7/2018 | Lim | H04N 21/4104 |
| 2018/0317266 | A1* | 11/2018 | Britt | H04L 67/125 |
| 2019/0075200 | A1* | 3/2019 | Seo | H04N 21/4126 |
| 2019/0182670 | A1* | 6/2019 | Maragoudakis | H04M 1/72412 |
| 2019/0202062 | A1* | 7/2019 | Park | H04W 4/70 |
| 2020/0007411 | A1* | 1/2020 | Arar | G06F 9/451 |
| 2020/0169427 | A1* | 5/2020 | Wu | H04L 12/282 |

OTHER PUBLICATIONS

Heun, et al., "Smarter Objects: Using AR technology to Program Physical Objects and their Interactions", Published Apr. 27, 2013; https://www.media.mit.edu/publications/smarter-objects-using-ar-technology-to-program-physical-objects-and-their-interactions/.

Mayer, et al., "Device Recognition for Intuitive Interaction with the Web of Things", Published Sep. 8, 2012; Viewed online Apr. 26, 2021 at http://dx.doi.org/10.1145/2494091.2494168.

* cited by examiner

SMART INTERNET OF THINGS MENUS WITH CAMERAS

TECHNICAL FIELD

The present disclosure is related generally to networked electronic devices and, more particularly, to systems and methods for facilitating user interactions with Internet of Things (IOT) devices.

BACKGROUND

The Internet of things is a network of physical devices in addition to the more traditional network-specific components such as servers, switches and so on. IOT devices can include home appliances (such as washing machines and refrigerators) and other devices (such as thermostats, lights and so on) that have electronic components, software, and connectivity elements that allow the device to connect with other devices or network elements to collect data, take action of provide some other useful function.

Due to their connectivity, many IOT devices can be remotely monitored and controlled once properly configured. However, the multitude of available devices, and the corresponding diversity of user interface implementations, can create difficulties for users attempting to interface with specific IOT devices.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objectives and advantages, may be best understood from the following detailed description taken in conjunction with the accompanying drawings of which:

DETAILED DESCRIPTION

Before discussing embodiments of the disclosed principles in full detail, an overview of certain embodiments is given to aid the reader in understanding the later more detailed discussion. Existing IOT network settings in general require the user to select which IOT device to pair, and to later remember the pairing in order to send control commands to the device. In such a setting, a visual device interface showing available devices and interacting user input selection is needed.

Moreover, once paired, existing IOT devices show the same control interface provided by the manufacturers to all users, and users thus often need to go through a complicated control menu to find the option of interest. In short, the control menu is not personalized and can be complicated. However, in an embodiment of the disclosed principles, multiple devices of the same type may be within the camera view of a user device, such as a cellular phone, and moreover, the user device will then display a relevant control menu tailored to fit the user's habits or personalized to the user based on user preferences. The latter benefit is enabled, in an embodiment, via authentication as well as behavioral learning and prediction.

In overview, a personalized and simplified wireless control mechanism for IOT devices identifies a device of interest to control and provides a custom control interface. With respect to IOT device identification, the system uses the camera of the user device, e.g., smartphone, when the camera is pointed at the IOT device of interest. With respect to the control interface, the identified IOT device may be controlled from the camera's display via a simplified device control menu.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Figure 1:
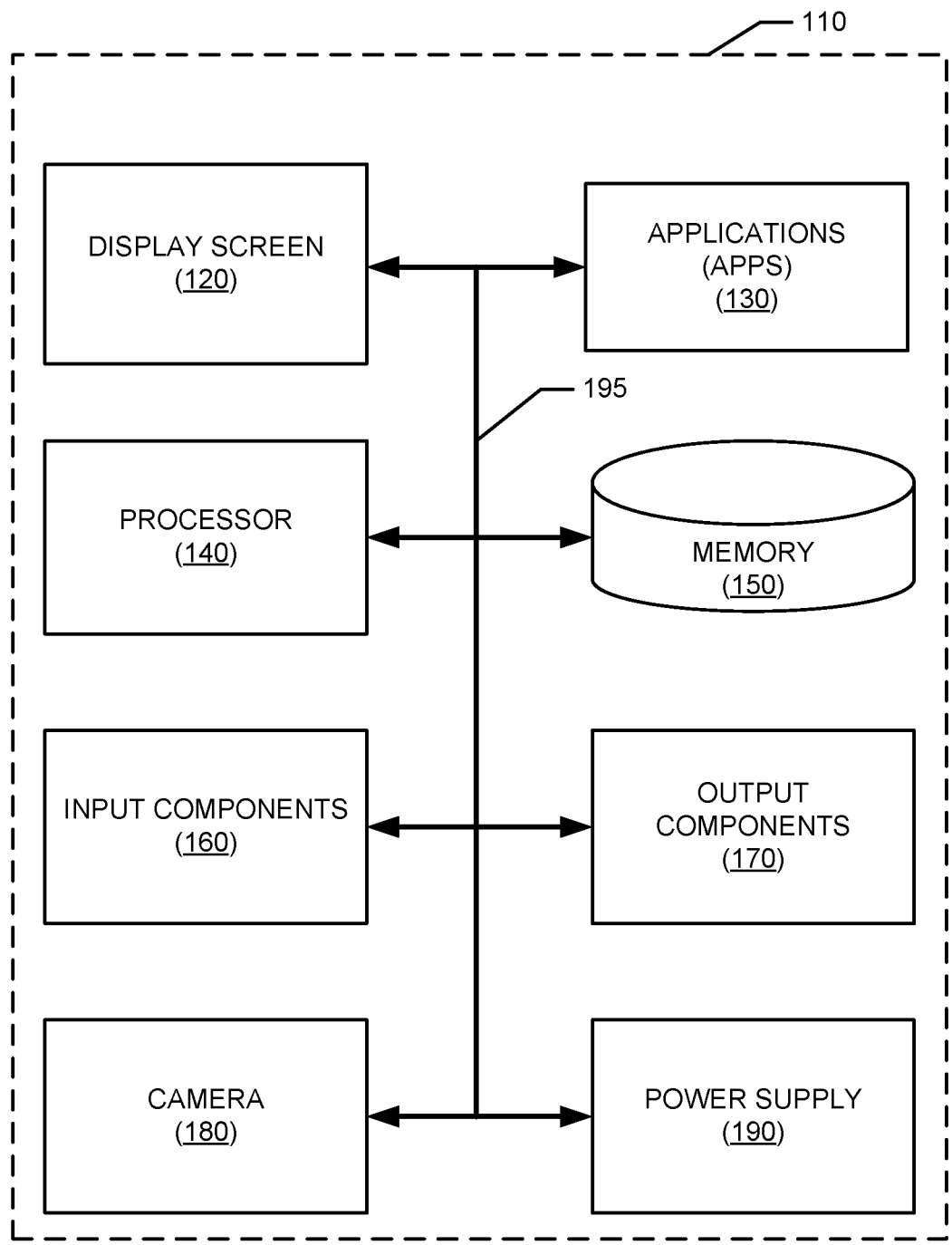
FIG. 1 is a schematic representation of a mobile electronic device in which various embodiments of the disclosed principles may be implemented.

Thus, for example, while FIG. 1 illustrates an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example, one or more antennas and associated circuitry and logic. The antennas and associated circuitry may support any number of protocols, e.g., WiFi, Bluetooth, cellular, etc.

The device 110 as illustrated also includes one or more output components 170 such as RF (radio frequency) or wired output facilities. The RF output facilities may similarly support any number of protocols, e.g., WiFi, Bluetooth, cellular, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments.

In an embodiment, the device 110 includes a camera 180 linked to the device processor 140. The camera 180 includes or is linked to operating software, and may be used for image capture, image-based tasks such as authentication as well as any other desired tasks.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display and may or may not include the one or more touch sensors 180.

Figure 2:
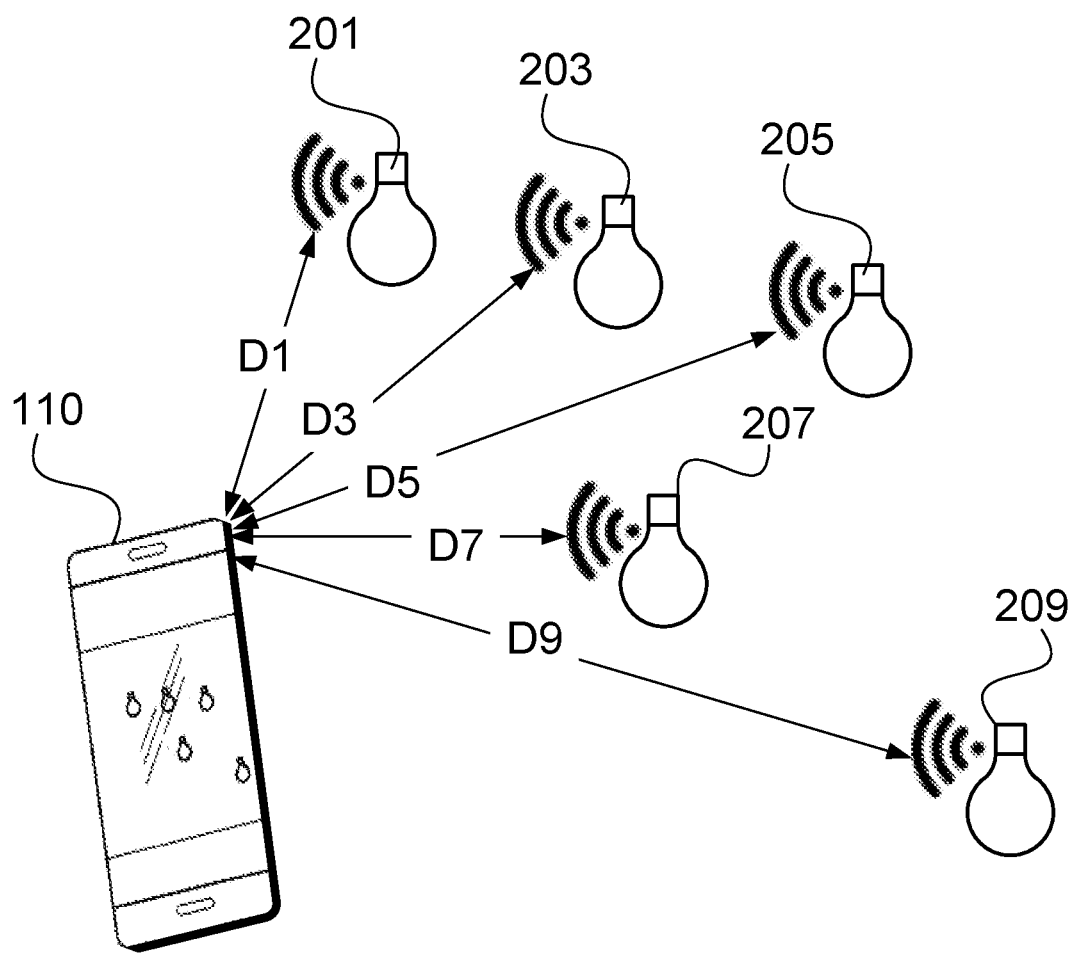
FIG. 2 is a device environment schematic showing a user device interacting with an array of IOT devices in accordance with an embodiment of the disclosed principles.

FIG. 2 is a device environment schematic showing a user device 110 interacting with an array of IOT devices 201, 203, 205, 207, 209 in accordance with an embodiment of the disclosed principles. In the illustrated example, the IOT devices 201, 203, 205, 207, 209 are shown as lighting fixtures, but it will be appreciated that the devices 201, 203, 205, 207, 209 may be any type of IOT device, and that the devices 201, 203, 205, 207, 209 need not be of the same type.

The user device 201, which may be a smartphone or other portable electronic communication device such as is shown in FIG. 1, includes a camera 140 (FIG. 1). The view angle of the camera 140 encompasses the array of IOT devices 201, 203, 205, 207, 209 in the example shown. Moreover, the distance between the user device 110 and each IOT device 201, 203, 205, 207, 209 is determined (illustrated in the Figure as distances D1, D3, D5, D7, D9). As can be seen from the illustrated example, D9 is the greatest, meaning that IOT device 209 lies the farthest from the user device 110, and D7 is the smallest, meaning that IOT device 207 the closest to the user device 110. The other IOT devices 201, 203 and 205 lie at intermediate distances D1, D3 and D5 respectively.

Figure 3:
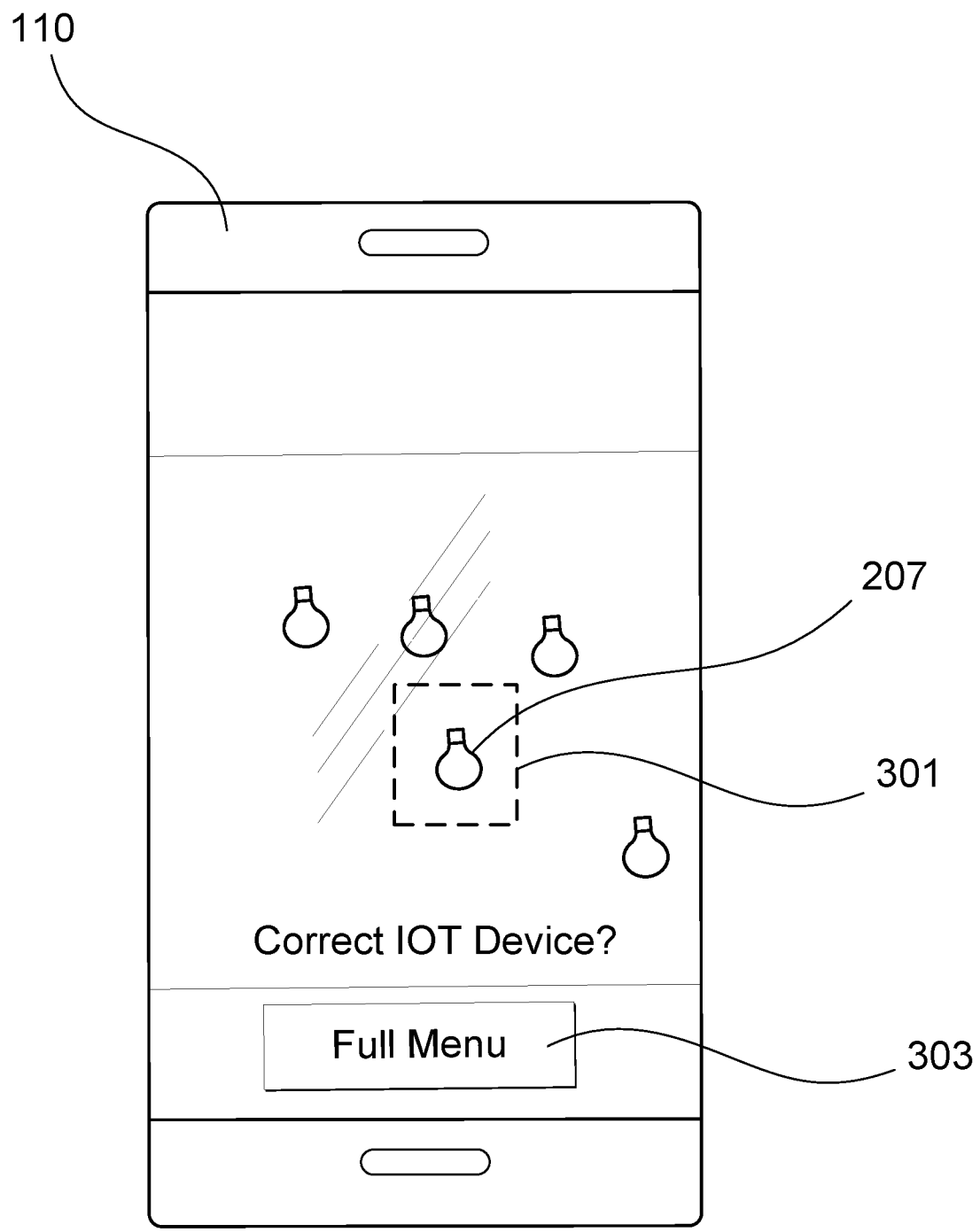
FIG. 3 is an example user interface schematic provided within the environment of FIG. 2.

In order for the user device 110 to determine which device is of current interest to the user, the smallest IOT device distance (D7) within the camera view is identified, and the device 110 then highlights the closest device 207 on-screen, as shown in FIG. 3. This assumes that the closest device is the one with which the user wishes to interact.

The highlight 301 may comprise a box, an outline, a color change or other suitable modification to visually distinguish the IOT device 207 of interest from the remaining IOT devices 201, 203, 205, 209. Alternatively or in addition to changing the image of the IOT device of interest 207, the user device 110 may alter the images of the remaining IOT devices 201, 203, 205, 209, e.g., by fading them, deleting them and so on.

The highlighted IOT device (207 in this example) may then be selected by the user to open a user interface for controlling the IOT device of interest 207. Alternatively, the user may indicate that the highlighted device is not the one of interest, e.g., by swiping across the highlighted device, tapping the image of another device, etc. Also, a Full Menu option 303 may be provided at this stage in the event the user wishes to both select the highlighted device 207 and see a full menu for that device 207.

In an embodiment, the user device 110 is configured to recognize the user (e.g., via facial recognition, prior authentication, etc.) and to predict the most likely actions to be taken by that user with respect to the identified IOT device 207 or by tapping on prior user engagement/history with the specific device. The prediction is based, in an embodiment, on the same user's prior actions relative to the IOT device of interest 207, e.g., user command history, access permission, time and so on. The user may also request a full menu in an embodiment of the disclosed principles, instead of the prediction-based menu.

Figure 4:
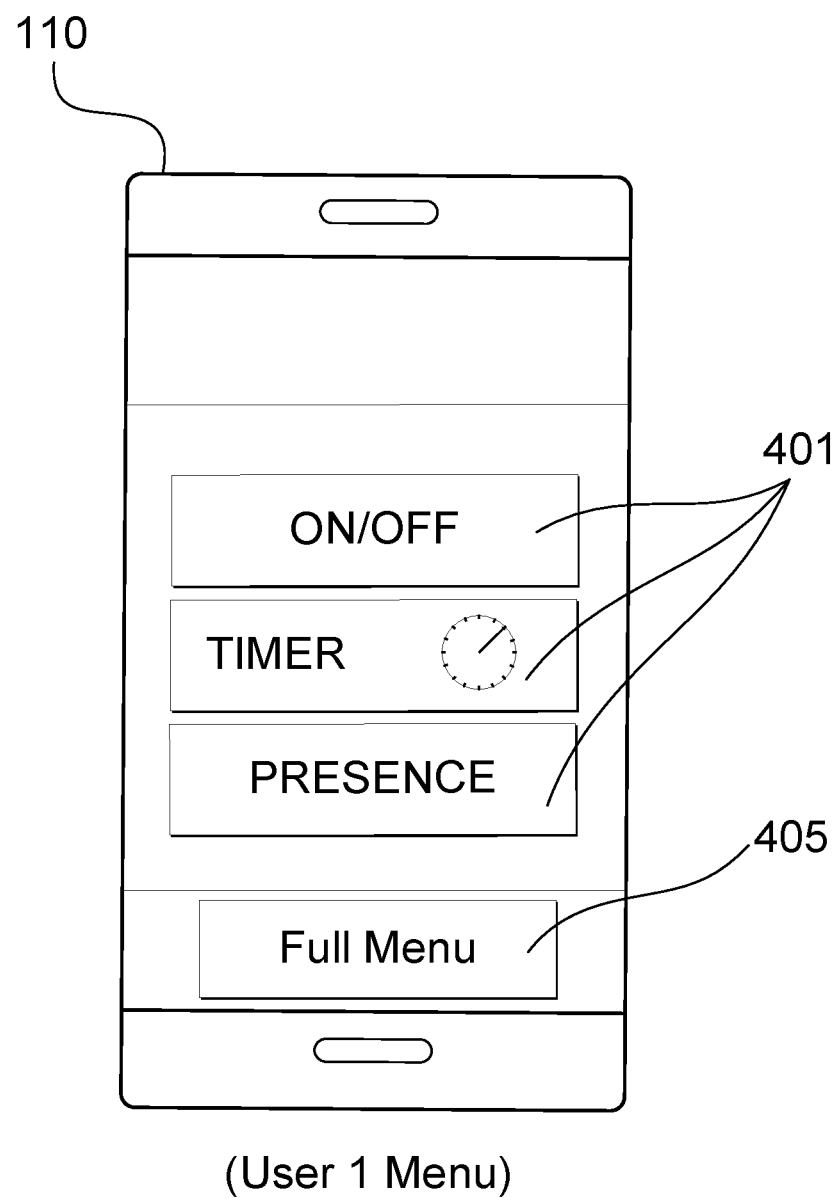
FIG. 4 is a first example of a customized IOT lighting device control menu in accordance with an embodiment of the disclosed principles.
Figure 5:
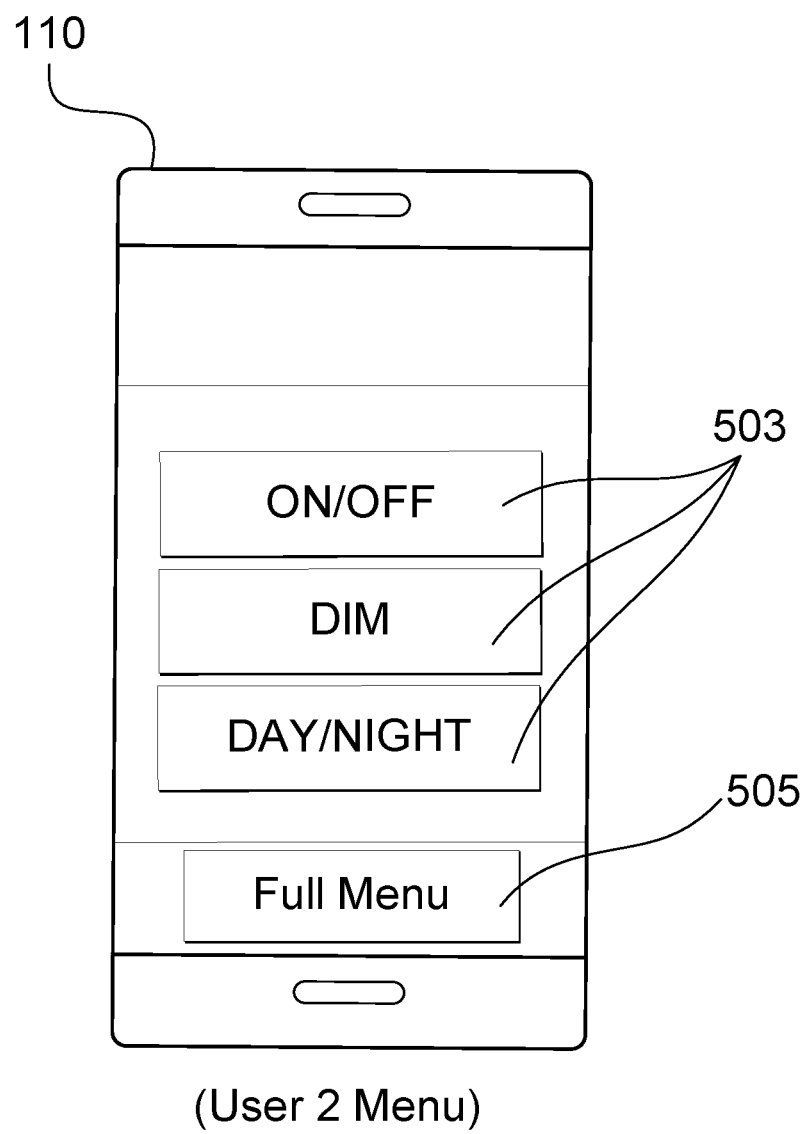
FIG. 5 is a second example of a customized IOT lighting device control menu in accordance with an embodiment of the disclosed principles.

FIGS. 4 and 5 show example predictive menus for a first user and a second user respectively of the user device 110. These figures assumes that the selected IOT device 207 is an IOT light fixture. As can be seen in FIG. 4, the customized menu for the first user includes the three setting controls 401 most frequently applied by user 1. In the illustrated example, these include light settings of On/Off, Timer, and Presence detection (e.g., such that the light turns on when a presence is detected).

In contrast, the provided selections in the predictive menu for the second user, as shown in FIG. 5, include three setting controls 503 shown as On/Off, Dim and Day/Night (e.g., on during nighttime hours and off during daylight hours). It will be appreciated that these menus are based on the hypothetical past control histories of user 1 and user 2 respectively, and may be identical, overlap or be entirely distinct, as their respective histories may dictate. There is no minimum or maximum number of options that may be shown, but three selections have been chosen for this example.

Figure 6:
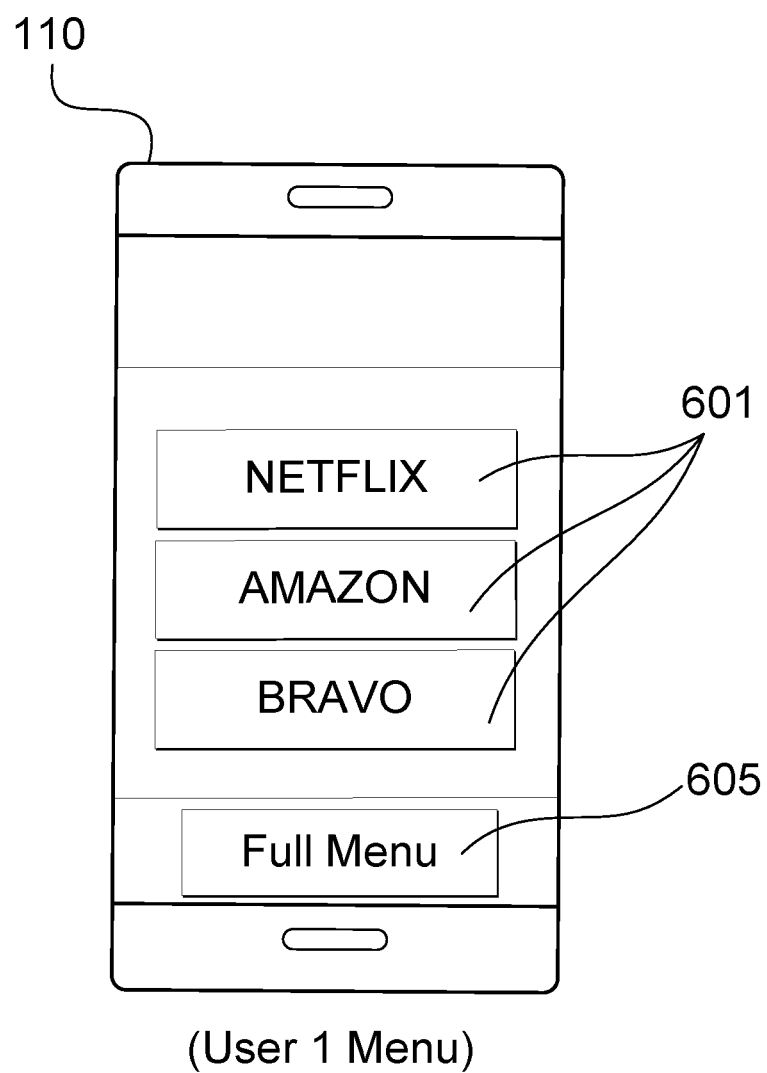
FIG. 6 is a first example of a customized IOT television device control menu in accordance with an embodiment of the disclosed principles.
Figure 7:
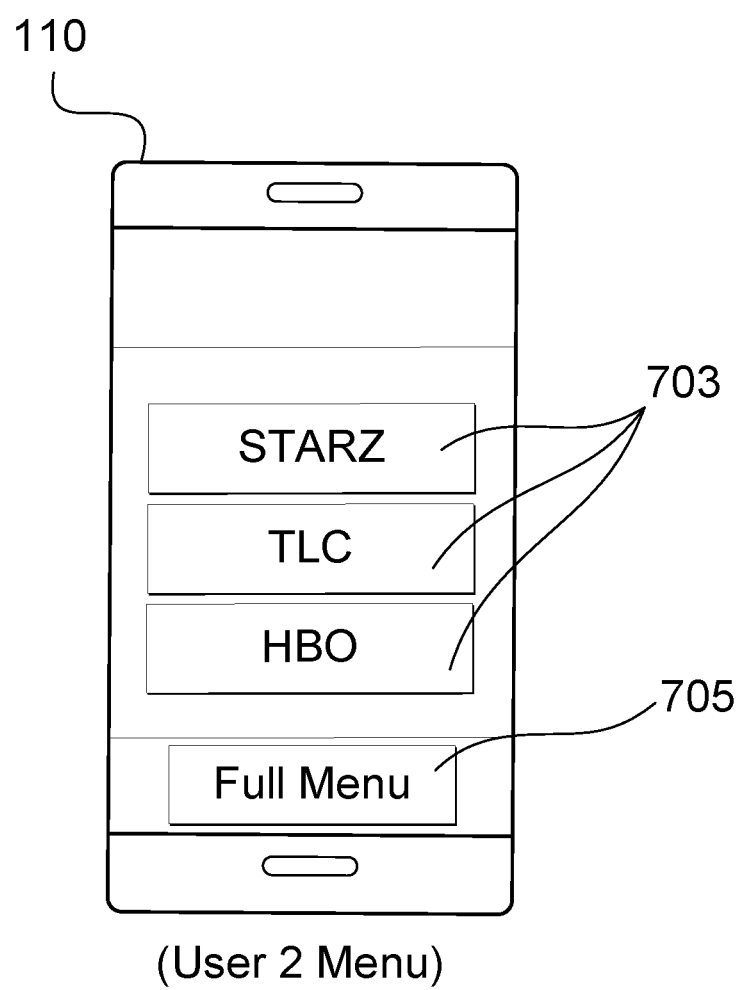
FIG. 7 is a second example of a customized IOT television device control menu in accordance with an embodiment of the disclosed principles.

As noted above, the controlled IOT device of interest may be any IOT device, and in this connection, FIGS. 6 and 7 show possible options presented to two different users when the IOT device of interest in an IOT Television. With respect to the first user, the interface of device 110 shows three options 601 including NETFLIX, AMAZON and BRAVO (FIG. 6), whereas the interface of device 110 for the second user shows the three options 703 STARZ, TLC and HBO (FIG. 7).

In each interface shown in FIGS. 4-7, a Full Menu option 405, 505, 605, 705 is provided in the event the user decides at that point to request a full menu. For example, a user may decide that the option of interest to them is not shown on the predictive menu, and thus they may select the Full Menu option 405, 505, 605, 705 to see or access all possible choices. As noted above, a Full Menu option 303 may also be provided at the device discovery stage as shown in FIG. 3.

Figure 8:
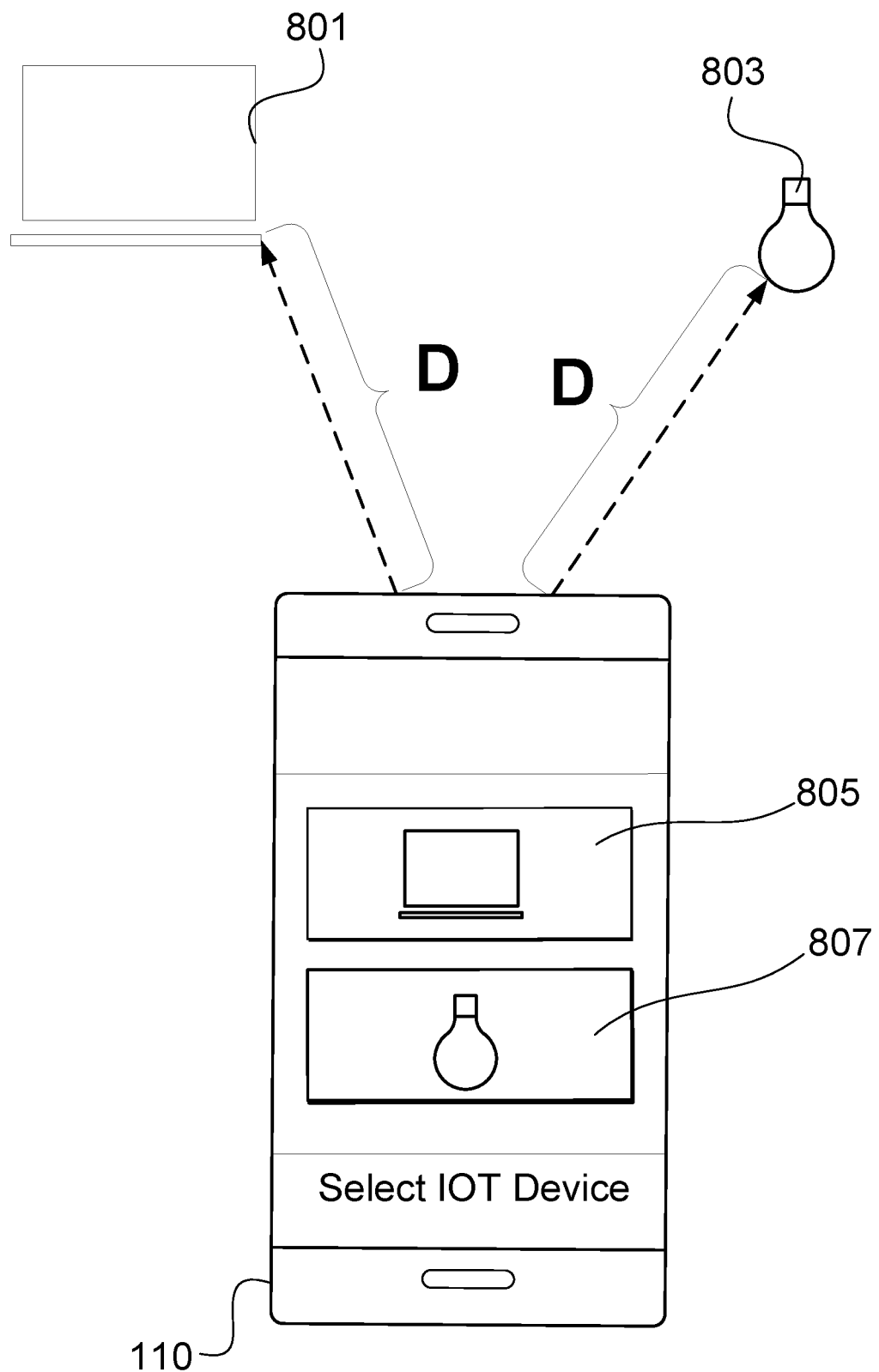
FIG. 8 is a schematic example of a device selection user interface in accordance with an embodiment of the disclosed principles wherein the possible IOT devices are of different types.

As will be discussed in greater depth below in the discussion of FIG. 8, the identification of the desired IOT device is not always straightforward. For example, if two devices are equidistant from the user device 110, as shown in FIG. 8, wherein IOT devices 801 and 803 both lie at distance D from user device 110, there will be no closest device. By selecting a device type from prompts 805 and 807, the user can differentiate the desired IOT device, but only if the IOT devices in question are of mutually distinct types.

Figure 9:
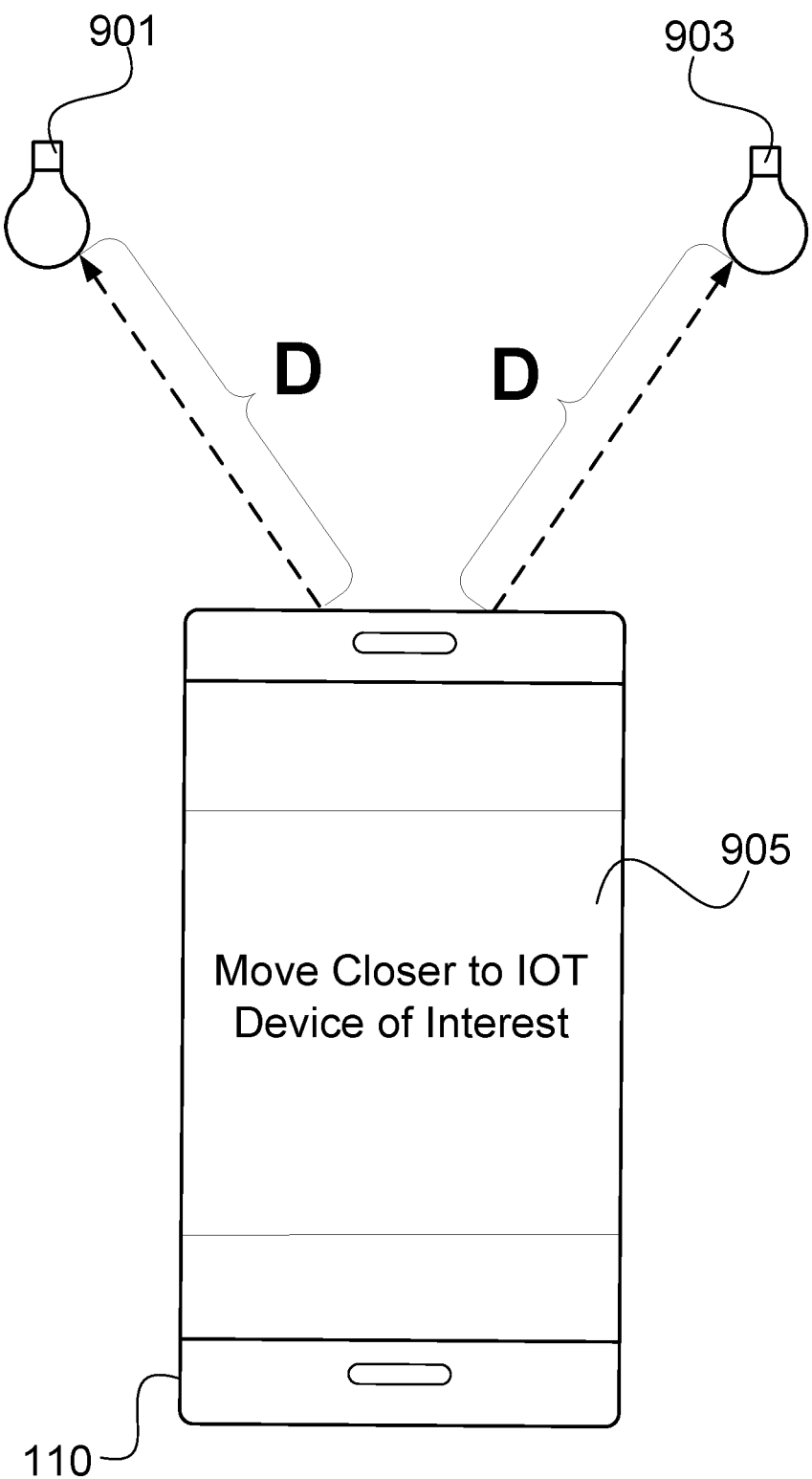
FIG. 9 is a schematic example of a device selection user interface in accordance with an embodiment of the disclosed principles wherein the possible IOT devices are of the same type.

As shown in FIG. 9, two identical IOT devices 901 and 903 may lie at the same distance D from the user device 110. In the event that the IOT devices are not only of the same type but are also equidistant from the user device 110, the device 110 is configured, in an embodiment, to request that the user move closer to the IOT device of interest. In the example of FIG. 9, the device 110 thus display the prompt 905 "Move Closer to IOT Device of Interest". Once the user (holding user device 110) moves closer to the IOT device of interest, the distance between the IOT device of interest and the user device 110 will then be the smallest and can be used to identify the IOT device of interest.

Figure 10:
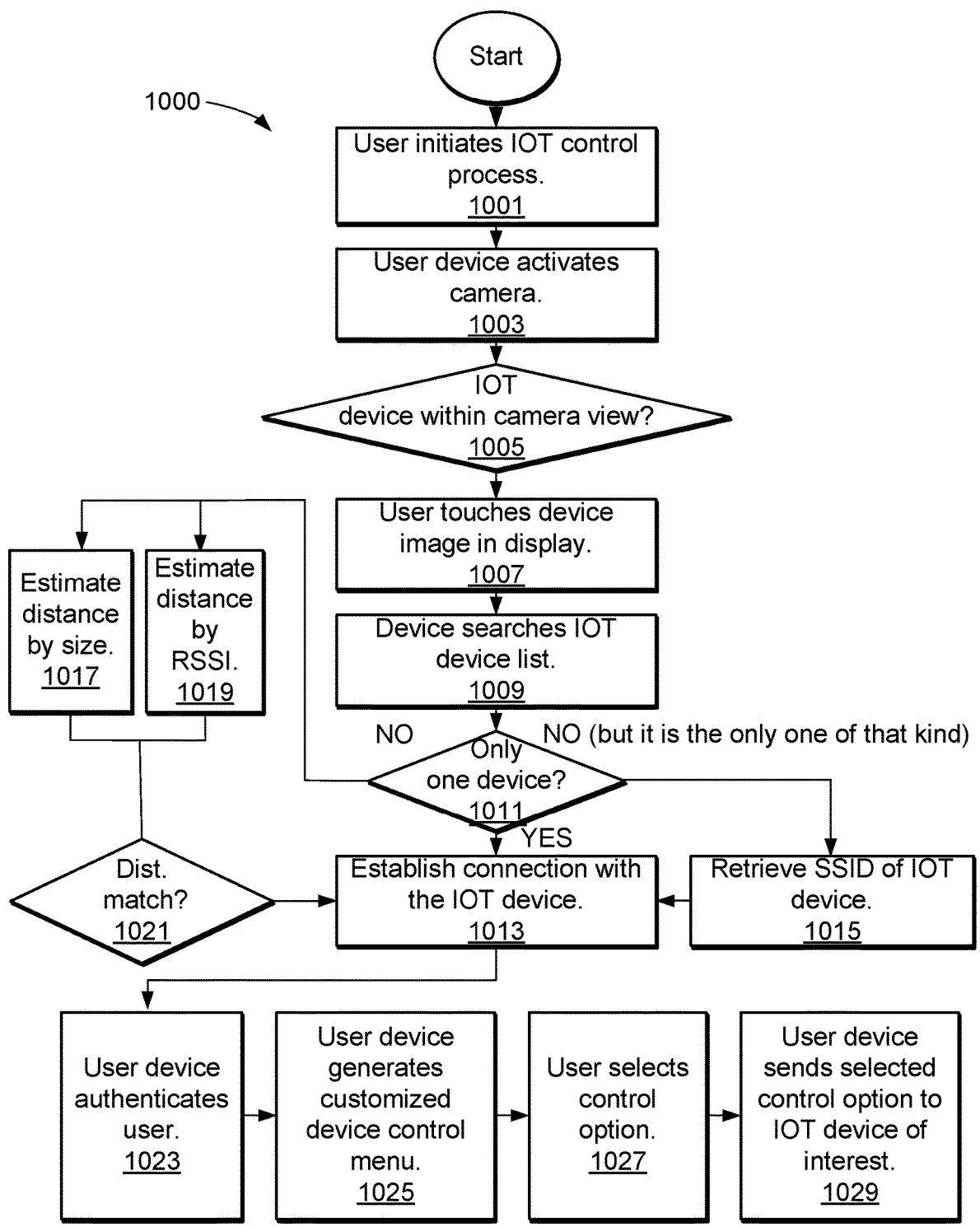
FIG. 10 is a flowchart illustrating a process in accordance with an embodiment of the disclosed principles for providing smart menus for IOT devices by employing a user device camera.

Turning to the flow chart of FIG. 10, this flowchart illustrates a process 1000 in keeping with the foregoing discussion for providing smart menus for IOT devices by employing a user device camera. At stage 1001 of the process 1000, the user initiates the IOT control process, e.g., by activating a corresponding application. The user device 110 activates its camera 190 at stage 1003. Alternatively, the IOT recognition process is active anytime the phone camera is active.

Continuing, if any IOT device is within the camera view as determined at stage 1005, the user touches the device in the user device's 110 display at stage 1007. Otherwise the process returns to stage 1003. If the user touched a device in the user device's 110 display at stage 1007, the user device 110 then searches through a device list in a current known IOT network at stage 1009. If only one IOT device exists in the network as determined at stage 1011, the user device 110 establishes a connection with that IOT device directly.

If instead, there are multiple IOT devices in the network as determined at stage 1011, but only one device of the kind the user selects, then the process flows to stage 1013, wherein the user device 110 retrieves the SSID (Service Set Identifier) of the IOT device and establishes connection with the device.

If however, there are multiple IOT devices of the kind of device the user selected in the network as determined at stage 1011, the process flows to stages 1017 and 1019, wherein the object distance is determined via two different methods. In particular, the user device estimates the distance between the phone and the IOT device by assessing the size of the device in the display at stage 1017 while also estimating the distance between the user device 110 and all IOT devices in the known network of the type the user selected by assessing the BT RSSI (Bluetooth Received Signal Strength Indicator) for each such IOT device at stage 1019.

If the distance estimated by the first technique matches, within a predetermined tolerance, a distance estimated by RSSI, as determined at stage 1019, the user device 110 establishes a connection with the device for which the match occurs at stage 1021.

At stage 1023, with an IOT device of interest identified and connected to the user device 110, the user device 110 authenticates the user. This may be executed via any suitable method, e.g., facial recognition with a device camera, such as authenticating the user via a device front camera when the user has pointed the device rear camera at the IOT device of interest to the user. Alternatively or additionally, the device 110 may use fingerprint authentication (e.g., using the fingerprint sensed when the user selected the IOT device of interest) or voice ID.

After identifying the IOT device of interest and authenticating the user, the user device 110 generates a simplified device control menu at stage 1025 whose content and format are derived based on the user's history, access permissions, time/location/environment or other user behavior stored within device or downloaded from cloud. As noted above, the user may be presented a full menu option which, when selected presents a full menu rather than a customized menu.

The user selects a control option at stage 1027 and a corresponding control command is then sent to the IOT device of interest at stage 1029. This transmission may either be direct or via the IOT hub, depending on the IOT network setting.

To provide a specific example of the foregoing process, consider a noisy environment such as a party within which the device user desires to change the music, or its characteristics, playing via an IOT speaker at a party. The user is unable to utilize voice commands because the background noise is too loud to allow audible command recognition. The user can instead point his or her phone camera at the IOT speaker and then control the IOT speaker from the phone's display.

Consider another example wherein a security robot is patrolling a shopping center and streaming video back to an operator's monitor. If the operator notices an IOT light in the streamed video is too dim, the operator can tap on the device on the monitor and it bring up a control menu for the device. This example shows that the user device 110 need not be a mobile device, and also that the described functions can be split between two devices, e.g., using an imaging function of a first device and a display function of a second device, with processing functions occurring at one or the other or both devices.

The examples herein generally refer to a touch sensitive display on the user device 110. However, it should be clear that such an interface need not be limited to finger touch, but may also, or alternatively, respond to a stylus touch and the like. Moreover, for IOT device control, different types of input are included within the term "touch sensitive." For example, the option buttons may be keyboard buttons instead of icon buttons, and other types of input for device control may be used. These include physical or virtual sliders (e.g., for setting a thermostat), dials (e.g., for device tuning), joysticks (e.g., for changing a camera orientation), and so on.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. An electronic communications device that provides smart internet of things (IOT) menus using a camera, the electronic communications device comprising:
    a touch-sensitive display;
    a camera; and
    a processor linked to the touch-sensitive display and the camera, and configured to capture an image of an IOT device, identify the IOT device, display the image of the IOT device via the touch-sensitive display, receive a user selection of the IOT device, identify a user of the electronic communications device, retrieve data regarding historical behavior defined by prior actions by the user identified by the electronic communications device when controlling the identified IOT device with the electronic communications device, generate a customized IOT device control menu for the identified IOT device using the historical behavior of the user of the electronic communications device, and display the customized IOT device control menu to the user via the touch-sensitive display;
    further comprising a radio link, and wherein the processor is further configured to identify the IOT device by:
        detecting a received signal strength indicator (RSSI) level of the IOT device to estimate a first distance;
        determining a size of the displayed image of the IOT device to estimate a second distance; and
        determining that the first distance estimated from the received RSSI level and second distance estimated from the size of the displayed image both correspond to the same distance within a predetermined tolerance.

2. The electronic communications device in accordance with claim 1, wherein the processor is further configured to identify the IOT device by retrieving IOT device data and identifying the IOT device via image object recognition.

3. The electronic communications device in accordance with claim 2, wherein the processor is further configured to retrieve the IOT device data over a network.

4. The electronic communications device in accordance with claim 2, wherein the electronic communications device further comprises a local memory, and wherein the processor is further configured to retrieve the IOT device data from the local memory.

5. The electronic communications device in accordance with claim 2, wherein the processor is further configured to automatically establish an electronic communication connection with the IOT device when the received RSSI level and the size of the displayed image both correspond to the same distance within the predetermined tolerance.

6. The electronic communications device in accordance with claim 5, wherein identifying the user of the electronic communications device comprises identifying the user via facial recognition after identifying the IOT device.

7. The electronic communications device in accordance with claim 1, wherein the user selection of the IOT device occurs when touch input is received at the image of the IOT device displayed on the touch-sensitive display.

8. The electronic communications device in accordance with claim 1, further comprising presenting a prompt on the display in response to detecting at least two IOT devices being substantially equidistant from the electronic communications device, the prompt instructing the user of the electronic communications device to move closer to the IOT device to make the user selection of the IOT device.

9. The electronic communications device in accordance with claim 1, wherein the processor is further configured to display a full menu option to the user of the electronic communications device, such that user-selection of the full menu option causes the processor to display a non-customized IOT device control menu to the user via the touch-sensitive display.

10. A method of providing smart internet of things (IOT) menus using a camera of an electronic communications device comprising:
    capturing an image of a plurality of IOT devices using a camera of the electronic communications device;
    identifying a closest IOT device from the plurality of IOT devices by determining which IOT device of the plurality of IOT devices is closest to the electronic communications device;
    displaying the image of the plurality of IOT devices on a display of the electronic communications device and highlighting the closest IOT device to visually distinguish the closest IOT device from remaining IOT devices of the plurality of IOT devices;

receiving a user selection of a selected IOT device from touch input occurring at the display;

identifying a user of the electronic communications device;

retrieving data regarding historical behavior of the user of the electronic communications device controlling the selected IOT device;

generating a customized IOT device control menu for the selected IOT device using the retrieved data regarding historical behavior of the user; and displaying the customized IOT device control menu to the user via the display of the electronic communications device;

wherein the determining which IOT device of the plurality of IOT devices is closest to the electronic communications device comprises estimating a distance by detecting a received signal strength indicator (RSSI) level of the IOT device, determining a size of the displayed image of the IOT device, and determining that the received RSSI level and the size of the displayed Image both correspond to the same distance within a predetermined tolerance.

11. The method in accordance with claim 10, wherein the closest IOT device is highlighted with one of a box, an outline, or a color change.

12. The method in accordance with claim 10, wherein:
when the user is identified as a first user, the customized IOT device control menu comprises a first set of setting controls; and
when the user is identified a second user, the customized IOT device control menu comprises a second set of setting controls;
wherein the first set of setting controls and the second set of setting controls are different.

13. The method in accordance with claim 10, wherein the customized IOT device control menu comprises a predictive menu based upon an access permission of the user to the electronics communication device.

14. The method in accordance with claim 10, wherein identifying the user of the electronic communications device comprises identifying the user via facial recognition.

15. The method in accordance with claim 10, wherein identifying the user of the electronic communications device comprises identifying the user via at least one of fingerprint recognition and voice recognition.

16. The method in accordance with claim 10, wherein displaying the customized IOT device control menu comprises displaying a full menu option, such that user-selection of the full menu option causes the display of a non-customized IOT device control menu.

17. A method of providing a customized IOT (internet of things) control menu to an electronic communications device user with respect to an IOT device of interest, the method comprising:

capturing an Image of the IOT device of interest via a camera of an electronic communications device when the user points the camera at the IOT device of interest;
identifying the IOT device of interest based on the captured image;
identifying the user to generate a user identity; and
displaying a first customized IOT control menu for the IOT device of interest when the user identity is associated with a first user; or
displaying a second customized IOT control menu when the user identity is associated with a second user;
wherein the first customized IOT control menu for the IOT device and the second customized IOT control menu for the IOT device are different; and
further comprising presenting a prompt on the display in response to detecting at least two IOT devices being substantially equidistant from the electronic communications device, the prompt instructing the user of the electronic communications device to move closer to the IOT device of interest to make a user selection of the IOT device of interest;
wherein displaying the customized IOT control menu for the IOT device of interest further comprises retrieving historical behavior information for the user, wherein the historical behavior information comprises information regarding control options previously selected by the user for the IOT device of interest, and generating the customized IOT control menu utilizing the historical behavior information.

18. The method in accordance with claim 17, further comprising confirming the user selection of the IOT of interest once the user has moved the electronic communications device close enough to the IOT of interest that the IOT of interest is closer than remaining IOT devices of the at least two IOT devices.

19. The method in accordance with claim 17, the prompt stating "Move Closer to IOT Device of Interest," further comprising displaying a full menu option to the user, receiving a user-selection of the full menu option and in response replacing the customized IOT control menu with a non-customized IOT control menu.

* * * * *